United States Patent
Hanyu et al.

(10) Patent No.: US 7,121,164 B2
(45) Date of Patent: Oct. 17, 2006

(54) HYBRID DRIVE SYSTEM

(75) Inventors: Tomoyuki Hanyu, Yokohama (JP); Kazuhiro Takeda, Yokosuka (JP); Hiraku Ooba, Yokohama (JP); Shinobu Kamada, Yokosuka (JP); Hiroshi Iwano, Yokohama (JP)

(73) Assignee: Nissan Motor Co., Ltd., Yokohama (JP)

( * ) Notice: Subject to any disclaimer, the term of this patent is extended or adjusted under 35 U.S.C. 154(b) by 187 days.

(21) Appl. No.: 10/980,812

(22) Filed: Nov. 4, 2004

(65) Prior Publication Data

US 2005/0098365 A1 May 12, 2005

(30) Foreign Application Priority Data

Nov. 12, 2003 (JP) ............................. 2003-382607

(51) Int. Cl.
*F16H 37/06* (2006.01)

(52) U.S. Cl. ....................................................... 74/661

(58) Field of Classification Search ................ 74/661; 903/918
See application file for complete search history.

(56) References Cited

U.S. PATENT DOCUMENTS

| | | | |
|---|---|---|---|
| 5,841,201 A * | 11/1998 | Tabata et al. | 290/40 C |
| 5,846,155 A * | 12/1998 | Taniguchi et al. | 477/2 |
| 6,053,842 A * | 4/2000 | Kitada et al. | 477/5 |
| 6,233,508 B1 * | 5/2001 | Deguchi et al. | 701/22 |
| 6,491,602 B1 * | 12/2002 | Hohn | 477/5 |
| 6,656,083 B1 * | 12/2003 | Esaki | 477/5 |

FOREIGN PATENT DOCUMENTS

| | | |
|---|---|---|
| JP | 61-088068 A | 5/1986 |
| JP | 61-112856 A | 5/1986 |
| JP | 06-174036 A | 6/1994 |
| JP | 08-135753 A | 5/1996 |
| JP | 2001-104000 A | 4/2001 |
| JP | 2002-104000 A | 4/2002 |
| JP | 2003-035352 A | 2/2003 |
| JP | 2004-122878 A | 4/2004 |

* cited by examiner

*Primary Examiner*—Dirk Wright
(74) *Attorney, Agent, or Firm*—Foley & Lardner LLP

(57) ABSTRACT

A hybrid drive system has an engine (11); a motor-generator (16); a transmission (12) for converting drive force inputted from at least one of the engine (11) and the motor-generator (16) and transmitting the converted drive force to a drive wheel (15); a first rotating shaft (41), a second rotating shaft (42) and a third rotating shaft (43) disposed mutually in parallel. The drive system includes a first gear wheel (21) disposed coaxially with the first rotating shaft (41); a first clutch (31) for engaging/disengaging the first gear wheel (21) with/from the first rotating shaft (41); a second gear wheel (22) disposed coaxially with the second rotating shaft (42); a second clutch (32) for engaging/disengaging the second gear wheel (22) with/from the second rotating shaft (42); a third gear wheel (23), engaging with the first gear wheel (21) or the second gear wheel (22) and disposed coaxially with the second rotating shaft (42) or the first rotating shaft (41); and a third clutch (33) for engaging/disengaging the third gear wheel (23) with/from the first rotating shaft (41) or the second rotating shaft (42). The motor-generator (16) is connected to the first rotating shaft (41). The engine (11) is connected to the third rotating shaft (43). The transmission (12) includes an input disc (12a) connected to the third rotating shaft; an output disc (12b) disposed coaxially with the input disc; and a power roller (12c) sandwiched in a tiltable fashion between the input disc and the output disc.

13 Claims, 12 Drawing Sheets

|  | LOW SPEED CLUTCH 30 | FIRST DOG CLUTCH 31 | SECOND DOG CLUTCH 32 | THIRD DOG CLUTCH 33 |
|---|---|---|---|---|
| FORWARD (ENGINE + MG) @ LOW-GEAR | ON | OFF | ON | ON |
| FORWARD (ENGINE + MG) @ HIGH-GEAR | ON | ON | ON | OFF |
| FORWARD MG @ HIGH-GEAR | OFF | ON | ON | OFF |
| FORWARD MG @ LOW-GEAR | ON | OFF | OFF | ON |
| REVERSE (ENGINE + MG) @ LOW-GEAR | ON | ON | OFF | ON |

FIG. 7

| | LOW SPEED CLUTCH 30 | FIRST DOG CLUTCH 31 | SECOND DOG CLUTCH 32 | THIRD DOG CLUTCH 33 |
|---|---|---|---|---|
| FORWARD (ENGINE + MG) @ LOW-GEAR | ON | OFF | ON | ON |
| FORWARD (ENGINE + MG) @ HIGH-GEAR | ON | ON | ON | OFF |
| FORWARD MG @ HIGH-GEAR | OFF | ON | ON | OFF |
| FORWARD MG @ LOW-GEAR | ON | OFF | OFF | ON |
| REVERSE (ENGINE + MG) @ LOW-GEAR | ON | ON | OFF | ON |

*FIG. 12*

HYBRID DRIVE SYSTEM

TECHNICAL FIELD OF THE INVENTION

This invention relates to a hybrid drive system comprising an engine, a motor-generator, and a transmission.

BACKGROUND OF THE INVENTION

Practical application of hybrid electric vehicles (HEVs) equipped with an engine and an electric motor-generator (hereinafter, referred to as "MG") has advanced in recent years. One type of HEV is equipped with a toroidal continuous variable transmission (hereinafter, referred to as "T-CVT"). In a T-CVT, an input disc and an output disc are disposed coaxially, and therefore the transmission is short in the radial direction of the discs, but it is long in the axial direction. Therefore, it is difficult to install a T-CVT in a vehicle in which the power train system is disposed in a transverse direction. Consequently, power train systems have been proposed wherein mountability is improved by eliminating the forward/reverse switching mechanism and torque converter, and hence reducing the length of the transmission. For example, JP-A-2002-104000 discloses a drive system wherein an MG and a T-CVT are disposed in parallel, and the vehicle is driven in reverse by using the MG as a drive source.

SUMMARY OF THE INVENTION

In this conventional drive system, the engine and MG are connected only to the input side of the transmission. Therefore, even if the vehicle is being driven by the MG alone (and the drive force of the engine is not required), the drive force must be transmitted to the drive wheels via the transmission, and hence the gear ratios of the transmission must be set adequately. Since hydraulic pressure is required in order to operate the transmission, the driving efficiency of the MG is reduced.

Furthermore, if the forward/reverse switching mechanism is eliminated in order to make the overall drive system more compact, the vehicle is driven in reverse by means of an MG having a changeable direction of rotation. However, in order to achieve drive efficiency equivalent to that of an engine, an MG capable of outputting high torque is required. Nevertheless, an MG of this kind will be large in size, have poor mountability, and cause costs to increase.

Moreover, since the reverse drive performance also depends on the charge stored in the battery, it is necessary either to install a large battery, or to install a large electrical generator in the engine.

It is an object of this invention to provide a drive system for a hybrid vehicle whereby the overall drive system can be made more compact, without requiring an MG of large torque.

In order to achieve the above object, this invention provides a drive system for a hybrid vehicle, having an engine; a motor-generator; and a toroidal continuous variable transmission for converting a drive force inputted from at least one of the engine and the motor-generator and transmitting the converted drive force to a drive wheel, comprising an input disc and an output disc disposed coaxially. The motor-generator comprises first engaging means for selecting transmission or non-transmission of drive force between the motor-generator and the input disc; and third engaging means for selecting transmission or non-transmission of the drive force between the motor-generator and the drive wheel. The transmission comprises second engaging means for selecting transmission or non-transmission of drive force between the output disc and the drive wheel.

This invention further provides a drive system for a hybrid vehicle, comprising: an engine; a motor-generator; a transmission for converting drive force inputted from at least one of the engine and the motor-generator and transmitting the converted drive force to a drive wheel; and a first rotating shaft, second rotating shaft and third rotating shaft disposed mutually in parallel. The drive system further comprises a first gear wheel disposed coaxially with the first rotating shaft; a first clutch for engaging the first gear wheel with the first rotating shaft and disengaging the first gear wheel from the first rotating shaft; a second gear wheel disposed coaxially with the second rotating shaft; a second clutch for engaging the second gear wheel with the second rotating shaft and disengaging the second gear wheel from the second rotating shaft; a third gear wheel, engaging with the first gear wheel or the second gear wheel and disposed coaxially with the second rotating shaft or the first rotating shaft; and a third clutch for engaging the third gear wheel with the first rotating shaft or the second rotating shaft and disengaging the third gear wheel from the first rotating shaft or the second rotating shaft. The motor-generator is connected to the first rotating shaft. The engine is connected to the third rotating shaft. The transmission comprises: an input disc connected to the third rotating shaft; an output disc disposed coaxially with the input disc; and a power roller sandwiched in a tiltable fashion between the input disc and the output disc. The speed ratio is changed by varying the angle of tilt of the power roller.

This invention yet further provides a drive system for a hybrid vehicle, comprising: an engine; a motor-generator; a transmission for converting drive force inputted from at least one of the engine and the motor-generator and transmitting the converted drive force to a drive wheel; a first rotating shaft, second rotating shaft and third rotating shaft disposed mutually in parallel. The drive system comprises a first gear wheel disposed coaxially with the first rotating shaft; a first clutch for engaging the first rotating shaft with the third rotating shaft, and disengaging the first rotating shaft from the third rotating shaft; a second gear wheel disposed coaxially with the second rotating shaft; a second clutch for engaging the second gear wheel with the second rotating shaft and disengaging the second gear wheel from the second rotating shaft; a third gear wheel disposed coaxially with the second rotating shaft and meshing with the first gear wheel; and a third clutch for engaging the third gear wheel with the second rotating shaft and disengaging the third gear wheel from the second rotating shaft. The motor-generator is connected to the first rotating shaft. The engine is connected to the third rotating shaft. The transmission comprises: an input disc connected to the third rotating shaft; an output disc disposed coaxially with the input disc; and a power roller sandwiched in a tiltable fashion between the input disc and the output disc. The speed ratio is changed by varying the angle of tilt of the power roller.

The details as well as other features and advantages of this invention are set forth in the remainder of the specification and are shown in the accompanying drawings.

BRIEF DESCRIPTION OF THE DRAWINGS

FIG. 7 is a table showing the correspondence between the operational states of the respective clutches according to the first embodiment, and the respective operational states of the hybrid vehicle.

FIG. 10 is a schematic diagram showing one example of a gear switching operation for the MG according to the third embodiment.

FIG. 12 is a table showing the correspondence between the operational states of the respective clutches according to the fourth embodiment, and the respective operational states of the hybrid vehicle.

PREFERRED EMBODIMENTS OF THE INVENTION

Figure 1:
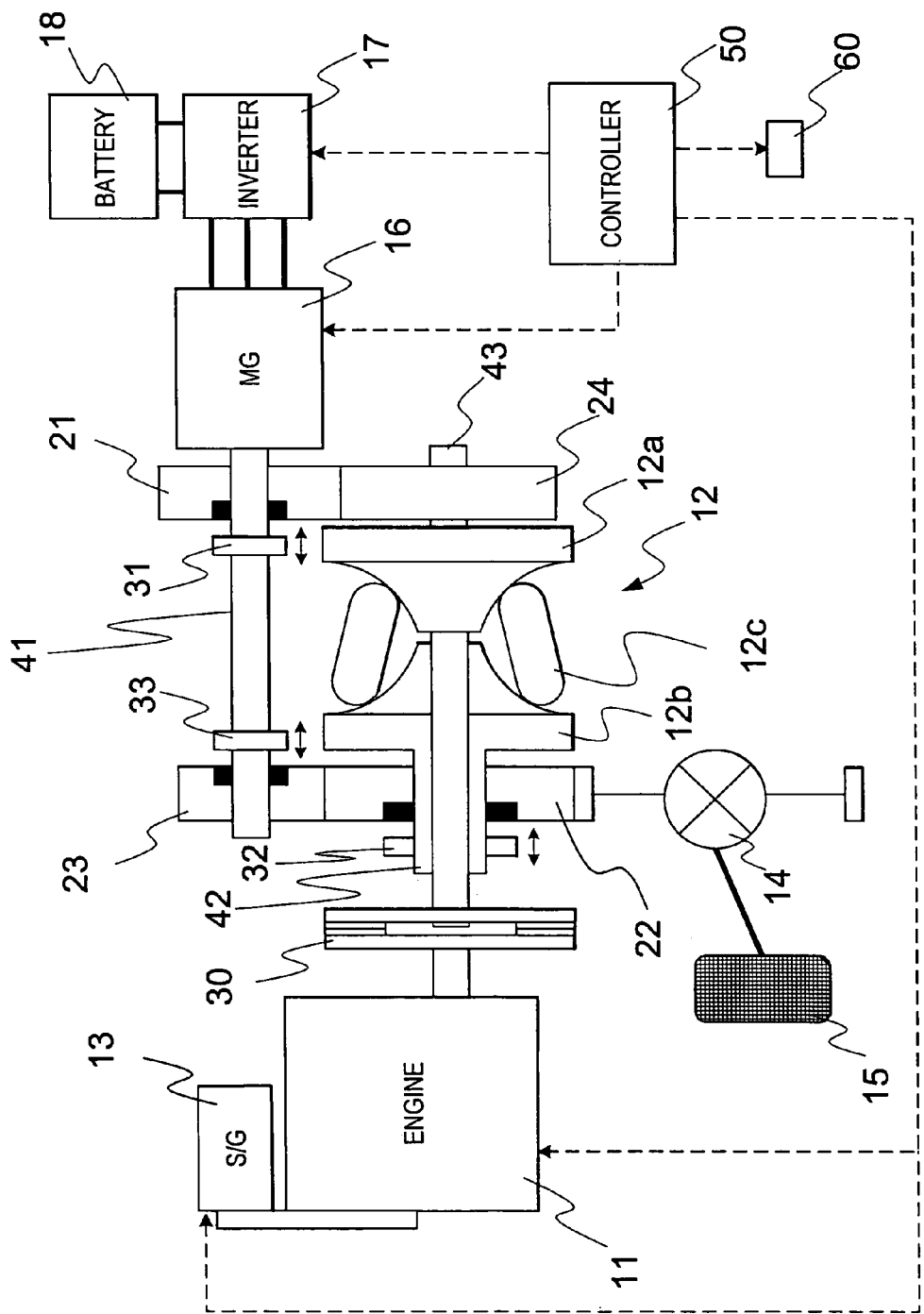
FIG. 1 is a schematic diagram showing a first embodiment of a drive system for a hybrid vehicle.

A first embodiment of a drive system for a hybrid vehicle (i.e., a hybrid drive system) will be described now with reference to FIG. 1. The engine 11 is an internal combustion engine which produces drive force. The MG (motor-generator) 16 is an electrical motor, which can also be operated as an electrical generator. The control device 17 of the MG 16 is an inverter. Moreover, the drive system comprises a battery 18, which supplies electrical power to the MG 16, and receives charge from same.

The engine 11 is started by a starter generator (hereinafter, "S/G") 13 having the functions of a starter and electrical generator.

The CVT 12 is a toroidal continuous variable transmission. A power roller 12c is disposed between an input disc 12a connected to the engine 11 via a low speed clutch 30, and an output disc 12b connected to the output gear (second gear) 22 via a second dog clutch 32 (or second claw clutch). The gear ratio is changed continuously by varying the angle of the power roller 12c. The input disc 12a and the output disc 12b are disposed coaxially, and when the vehicle is driven by the engine 11, they rotate in mutually opposite directions. A hollow second rotating shaft 42 is coupled to the output disc 12b. The output gear 22 is engaged with and disengaged from the second rotating shaft 42, by means of a second dog clutch 32.

The engine output shaft (third rotating shaft) 43 is connected to the engine 11 via the low speed clutch 30, and it is also connected to the input disc 12a of the CVT 12.

The MG output shaft (first rotating shaft) 41, which is the output shaft of the MG 16, is disposed in parallel with the CVT 12, and a first gear wheel 21, a third gear wheel 23, a first dog clutch 31 (or first claw clutch) and a third dog clutch 33 (or third claw clutch) are provided on the MG output shaft 41. By means of the first gear wheel 21 and the third gear wheel 23 respectively engaging with the first dog clutch 31 and the third dog clutch 33, the first gear wheel 21 and the third gear wheel 23 become bound to the MG output shaft 41 and hence capable of transmitting the torque of the MG 16. The first gear wheel 21 engages with a fourth gear wheel 24 on the engine output shaft 43. Furthermore, the third gear wheel 23 engages with the output gear 22.

The drive force of the engine 11 and the MG 16 transmitted from the output gear 22 is transferred successively to a differential gear 14 and a drive wheel 15, thereby causing the vehicle to travel.

All of the dog clutches 31–33 and the low speed clutch 30 are provided with clutch actuators, which are operated by commands from a controller 50. The controller 50 receives commands from the driver or operator via an operating part such as an accelerator pedal or shift lever, and controls the operation of the whole hybrid drive system. The controller 50 also controls the engine 11, the transmission 12, the MG 16, and the hydraulic system 60 of the transmission 12. The controller 22 is provided with a microcomputer comprising a central processing unit (CPU), a read only memory (ROM), a random access memory (RAM), and an input/output interface (I/O interface).

The drive force of the MG 16 can be transmitted to the drive wheel 15 without passing via the transmission 12. Therefore, since the hydraulic pressure of the transmission is not required, highly efficient driving can be achieved. Moreover, since a torque converter and a front/reverse switching mechanism can be omitted, it is possible to reduce the length of the system.

(Reverse Mode Using Engine)

Figure 2:
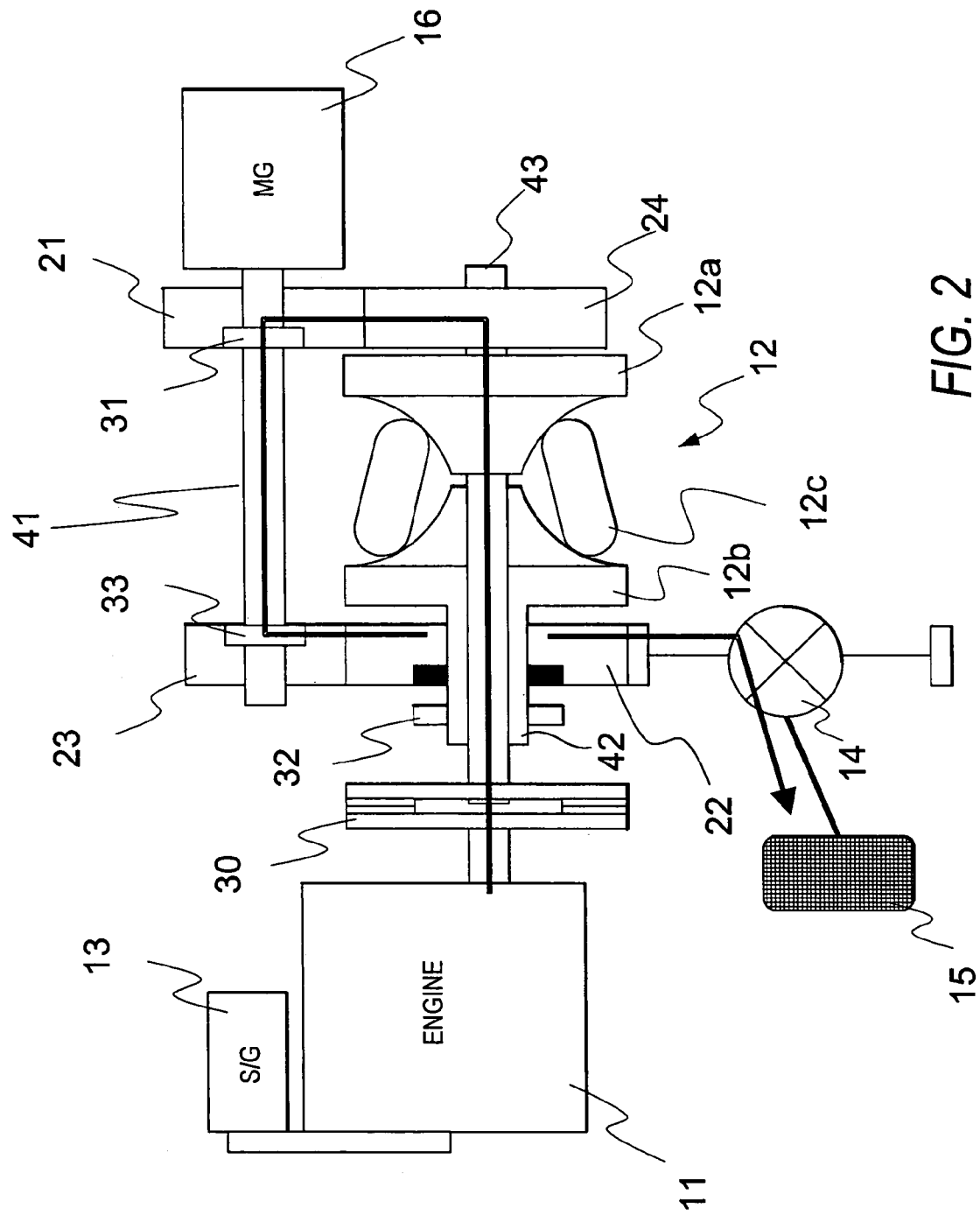
FIG. 2 is a schematic diagram showing the drive force transmission path in the drive system according to the first embodiment, in a case where the vehicle is driven in reverse by the drive force of the engine.

A drive force transmission path in a drive system where a vehicle is driven in reverse by the drive force of the engine 11 is now described with reference to FIG. 2. The solid thick arrow in the diagram indicates the drive force transmission path.

The second dog clutch 32 is disengaged, and the first dog clutch 31 and the third dog clutch 33 are engaged respectively to the first gear wheel 21 and the third gear wheel 23. In so doing, the vehicle is driven in reverse by the torque of the engine 11 and the MG 16.

Since the CVT 12 is a toroidal CVT, the input disc 12a and the output disc 12b rotate in mutually opposite directions. Since the drive system is composed in such a manner that the vehicle is driven forward via the CVT 12, the vehicle travels forward when the output gear 22 rotates in the opposite direction to the engine 11. On the other hand, when the first dog clutch 31 and the third dog clutch 33 are engaged respectively with the first gear wheel 21 and the third gear wheel 23, then the third gear wheel 23 on the MG output shaft 41, which is provided in parallel with the CVT 12 and the engine output shaft, rotates in the opposite direction to the engine 11, and hence the output gear 22 rotates in the same direction as the engine 11. Therefore; in this case, the vehicle is driven in reverse. By controlling the low speed clutch 30 disposed between the engine 11 and engine output shaft 43, it is possible to perform reverse travel by means of the engine 11 only.

Furthermore, the gear ratio (speed reduction ratio) R when the vehicle is driven in reverse by the engine 11 is as indicated below.

The relationship between the fourth gear wheel 24 of the engine output shaft 43 and the first gear wheel 21 of the MG output shaft 41 is indicated below.

$$(\text{Rotational speed of } MG\,16)/(\text{Rotational speed of engine } 11)=R_H \qquad (1)$$

Here, the rotational speed of the MG 16 corresponds to the rotational speed of the first gear wheel 21, and the rotational speed of the engine 11 corresponds to the rotational speed of the fourth gear wheel 24.

Furthermore, the relationship between the third gear wheel 23 and the output gear 22 is indicated below.

$$(\text{Rotational speed of } MG\,16)/(\text{Rotational speed of output gear } 22)=R_L \qquad (2)$$

Therefore, the gear ratio when reversing can be expressed as follows, from equations (1) and (2).

$$((\text{Rotational speed of engine } 11)/(\text{rotational speed of } MG\,16))\times((\text{rotational speed of } MG\,16)/(\text{rotational speed of output gear } 22))=R_L/R_H \qquad (3)$$

Due to vehicle characteristics, the gear ratio during reverse travel is 1 or above (excluding the action of the final gear), and therefore the following relationship is established.

$$R_H<R_L \qquad (4)$$

Therefore, a greater action in terms of amplifying the torque of the MG 16 is obtained when the third gear wheel 23 is used. Therefore, the third gear wheel 23 is called a low gear, and the first gear wheel 21 is called a high gear. The number of teeth on the third gear wheel 23 may be lower than the number of teeth on the first gear wheel 21.

By providing one or more reverse gears, it is possible to achieve various gear ratios when the vehicle is driven in reverse. Moreover, by setting the gear ratio in accordance with the capacity of the motor, while maintaining the relationship described above, it is possible to provide assistance from the motor across a broad speed range, when driving both at high speed and at low speed, by switching the gear accordingly.

(Forward and Reverse Mode Using MG)

Figure 3:
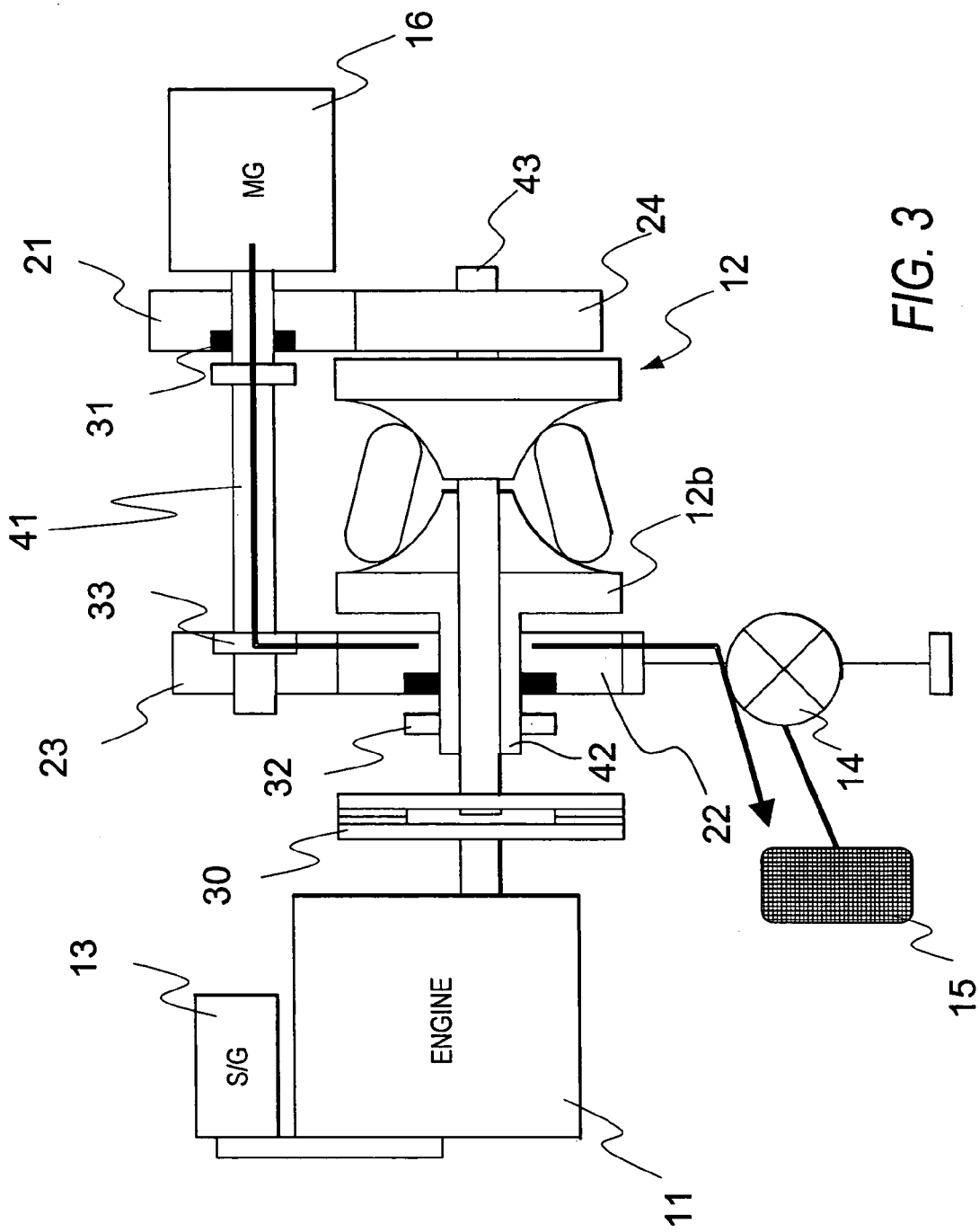
FIG. 3 is a schematic diagram showing the drive force transmission path in the drive system according to the first embodiment, in a case where the vehicle is driven forward and in reverse by the drive force of the motor-generator (MG).

A drive force transmission path in a drive system where a vehicle is driven forward or in reverse by the drive force of the MG 16 is now described with reference to FIG. 3.

The second dog clutch 32 is disengaged and the third dog clutch 33 is engaged to the low gear (third gear wheel 23). Thereby, the vehicle is driven forward or in reverse by the torque of the MG 16. Since the drive force characteristics of the MG 16 do not vary at all with respect to the direction of rotation, forward and reverse travel can be achieved readily by controlling the direction of rotation of the MG 16. In this case, the drive force of the MG 16 is not transmitted via the CVT 12, and therefore hydraulic pressure for operating the CVT 12 is not required. Consequently, the vehicle can be driven in a highly efficient manner by the MG.

(Low Speed Forward Drive Mode Using Engine and MG)

Figure 4:
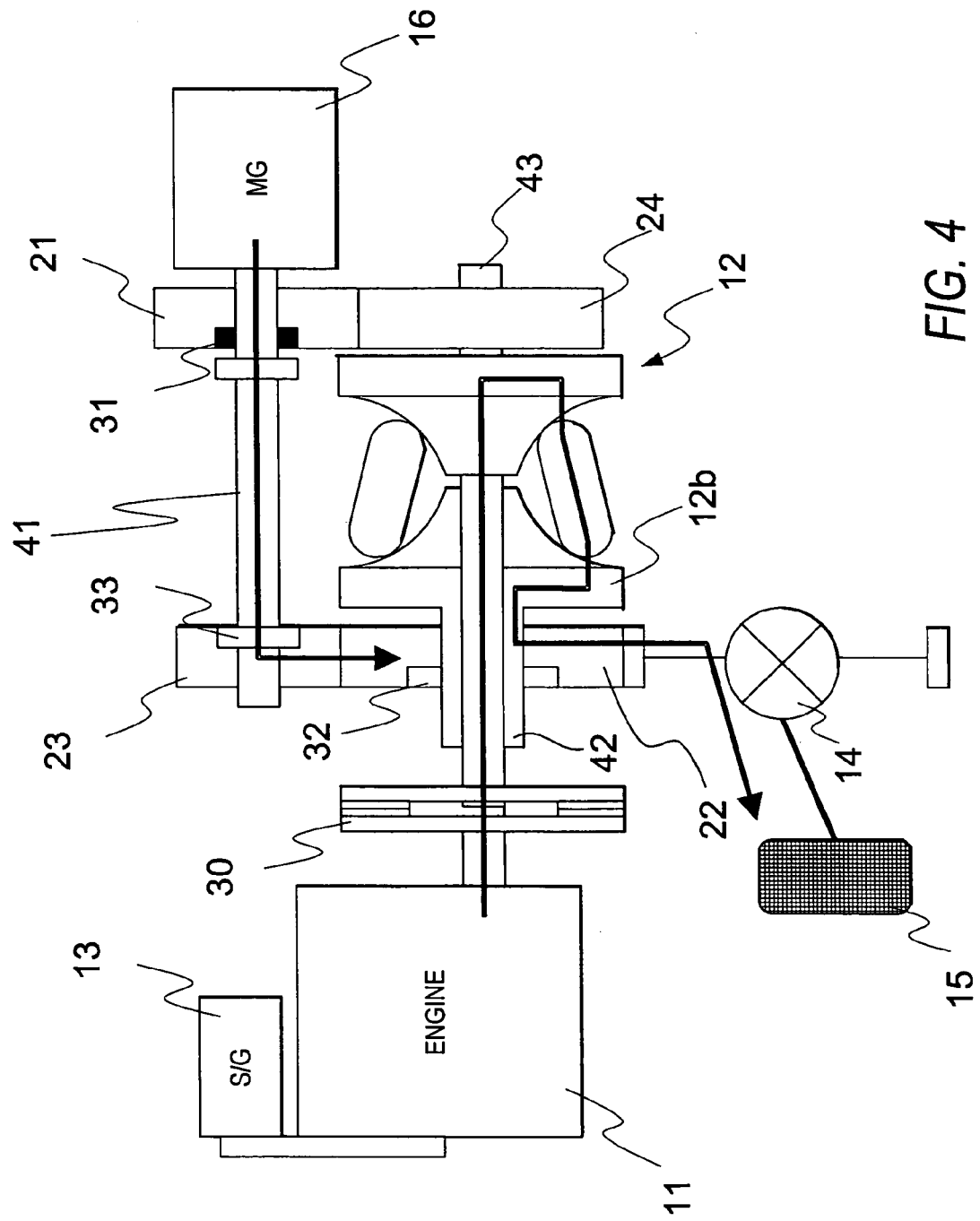
FIG. 4 is a schematic diagram showing the drive force transmission path in the drive system according to the first embodiment, in a case where the vehicle is driven forward at low speed by the drive force of the engine and the MG.

A drive power transmission path in a drive system where a vehicle is driven forward at low speed by the drive power of the engine 11 and the MG 16 is now described with reference to FIG. 4.

In a state where the third dog clutch 33 is engaged to the low gear (third gear wheel 23), the second dog clutch 32 is engaged. In so doing, the vehicle is driven forward by the torque of the engine 11 and the MG 16. In other words, the vehicle changes from travel based on the force of the MG to travel based on the combined force of the engine and MG.

After starting up the engine 11, the low speed clutch 30 is used to control the rotational speed of the output disc 12b, in such a manner that the output disc 12b and the output gear 22 have a rotational speed differential at which the second dog clutch 32 can be engaged with the output gear 22. The shock produced when engaging the second dog clutch 32 is absorbed by slippage of the low speed clutch 30. When the second dog clutch 32 has been engaged, the low speed clutch 30 is engaged completely.

In this state, since the torque of the MG 16 is transmitted only to the gear wheel system, it is possible to minimize mechanical loss during regeneration.

(High Speed Forward Drive Mode Using Engine and MG)

Figure 5:
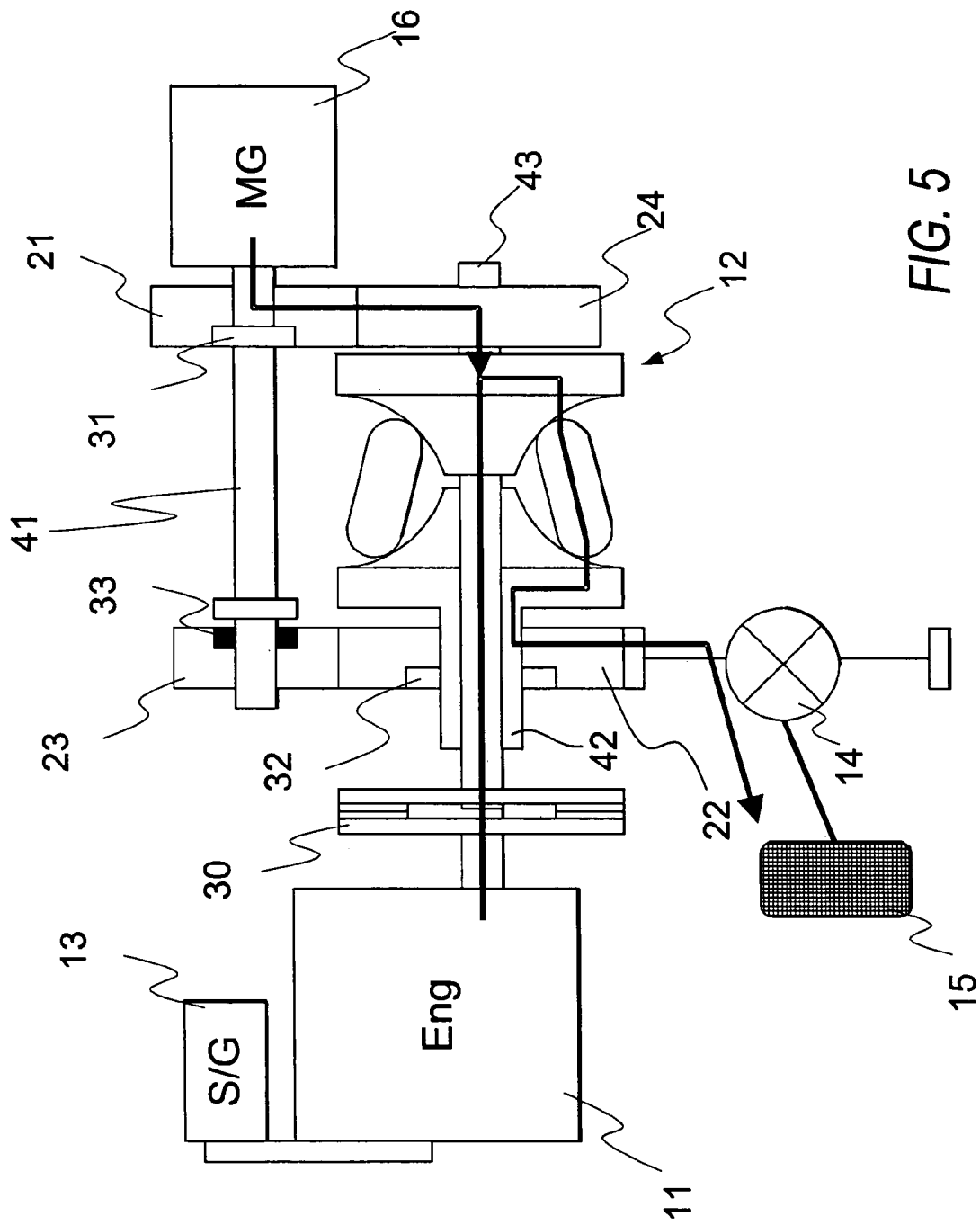
FIG. 5 is a schematic diagram showing the drive force transmission path in the drive system according to the first embodiment, in a case where the vehicle is driven forward at high speed by the drive force of the engine and the MG.

FIG. 5 is a diagram illustrating a drive force transmission path in a drive system where a vehicle is driven forward at high speed by the drive power of the engine 11 and the MG 16.

The first dog clutch 31 engages with the high gear (first gear wheel 21), and the third dog clutch 33 is disengaged. The torque of the engine 11 and the MG 16 is combined in the engine output shaft 43, and is transmitted to the drive wheels via the CVT 12. Electric motors generally have a broader high efficiency range and a broader drive range than internal combustion engines. Therefore, by selecting a suitable high gear ratio $R_H$, the engine 11 and the MG 16 are both able to operate in their high efficiency ranges.

Figure 6:
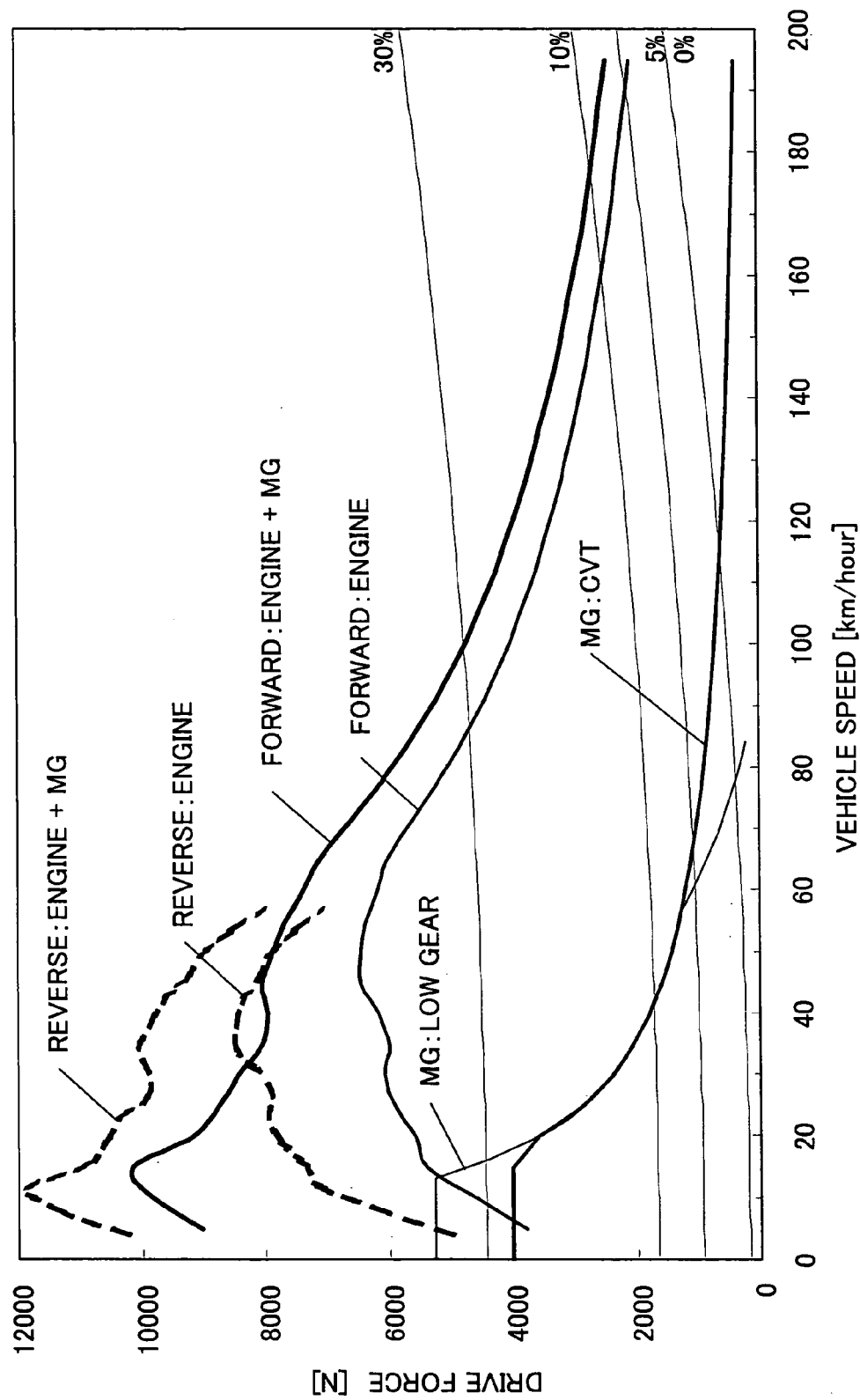
FIG. 6 is a schematic diagram showing an example of drive characteristics of the drive system according to the first embodiment.

An example of drive characteristics in a hybrid vehicle is now described with reference to FIG. 6. Here, the maximum output of the MG 16 is approximately 20% that of the engine 11. If the vehicle is driven in reverse (or forward) by the combined action of the engine 11 and the MG 16, then a significantly larger drive force is generated compared to a case where the vehicle is driven in reverse (or forward) by the MG 16 alone.

FIG. 7 gives an overview of the operational states of the respective clutches in respective operational states of the hybrid vehicle. The item before the @ symbol indicates the drive source, and the item after the @ symbol indicates the gear used for transmitting torque. For example, "(engine+MG)@ low gear" indicates a driving mode in which both the engine and the MG are used as drive sources, and the low gear is used as the gear (the same applies below). Furthermore, an engaged state of a clutch is indicated by "ON", and a disengaged state is indicated by "OFF". By changing the state of engagement of the clutches, it is possible readily to change the operating mode.

Since there is no large consumption of energy in engaging a clutch, then in addition to optimizing the operating point of the engine via the CVT, high system efficiency and good fuel consumption can also be anticipated.

The mode "MG @ high gear" where only the MG is used as the drive source in combination with a high gear is an operational state chosen principally during regeneration. By operating the low speed clutch 30 only, the mode can be transferred swiftly to the drive mode using engine and MG.

Figure 8:
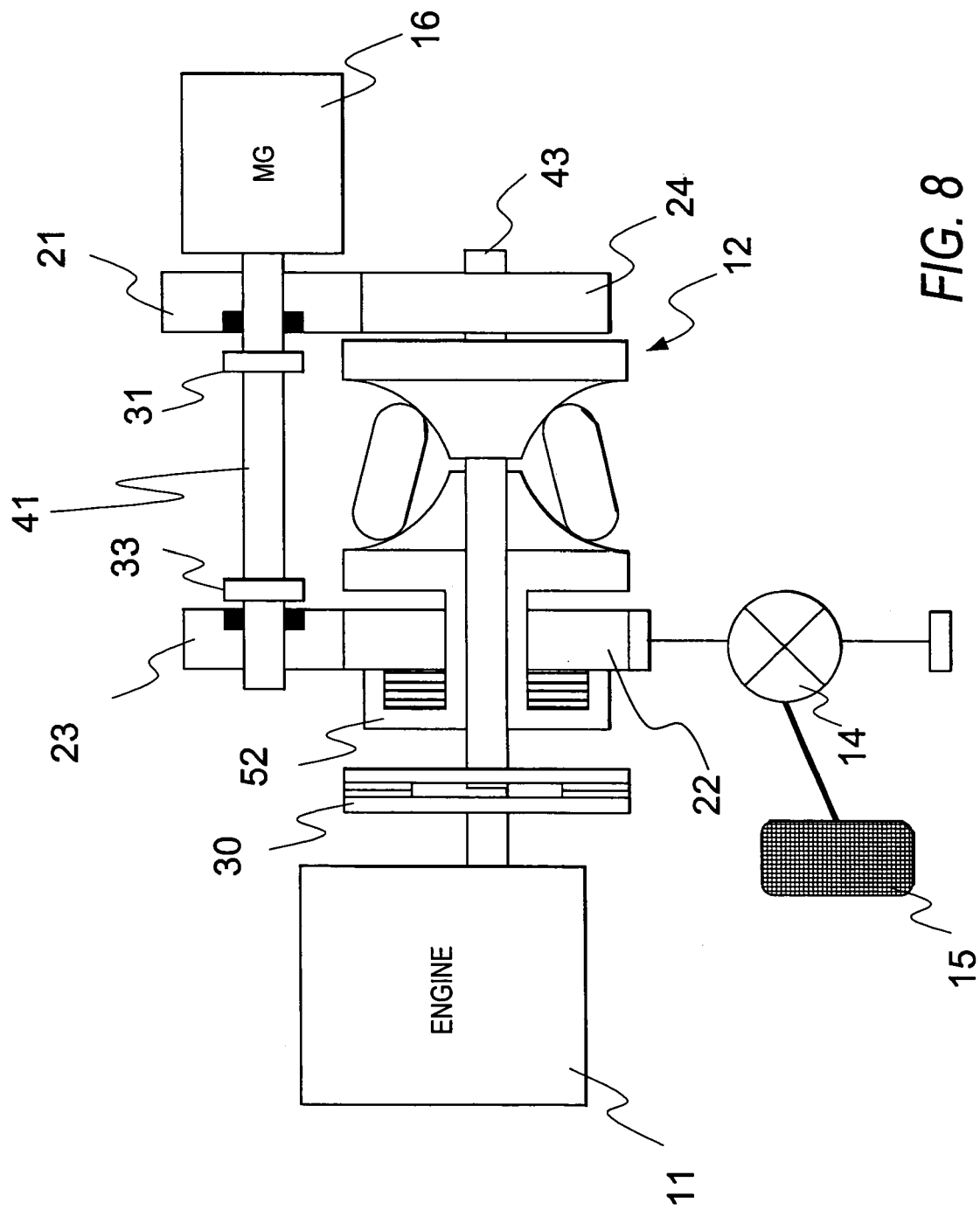
FIG. 8 is a schematic diagram showing a second embodiment of a drive system for a hybrid vehicle.

A second embodiment of a drive system for a hybrid vehicle (i.e., a hybrid drive system) will be described now with reference to FIG. 8. In the various embodiments described below, parts which perform similar functions to those in the first embodiment are labeled with the same reference numerals and repeated description thereof is omitted here.

In the present embodiment, a multiple-plate clutch 52 (i.e., friction clutch) is used instead of the second dog clutch 32 in the first embodiment. The multiple-plate clutch 52 can be varied in a continuous fashion between transmitting drive force (from the CVT 12 to the output gear 22), and interrupting the transmission of drive force. Therefore, it is possible for the vehicle to transfer smoothly to driving by the engine 11 using the CVT 12.

Figure 9:
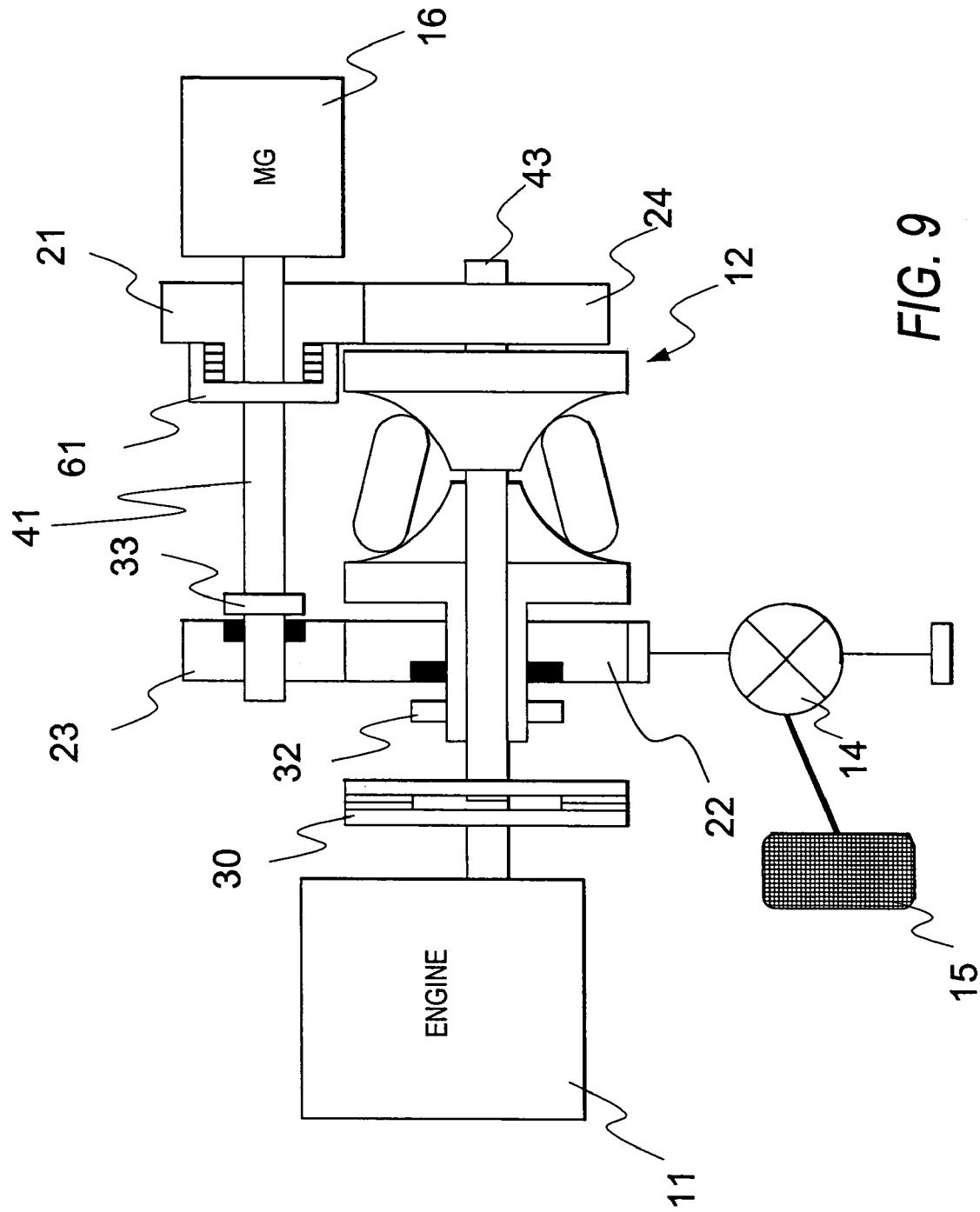
FIG. 9 is a schematic diagram showing a third embodiment of a drive system for a hybrid vehicle.

A third embodiment of a drive system for a hybrid vehicle will be described now with reference to FIG. 9.

In the present embodiment, a multiple-plate clutch 61 (i.e., friction clutch) is used instead of the first dog clutch 31 in the first embodiment. The multiple-plate clutch 61 is engaged with and disengaged from the high gear wheel 21 and the MG 16.

In the drive system according to this invention, when the vehicle is being driven by the engine, it is necessary to reverse the direction of rotation of the MG 16 when the MG gear is switched. According to the present embodiment, by controlling the multiple-plate clutch 61 when the torque-transmitting gear of the MG 16 is switched from the low gear 23 to the high gear 21, it is possible to shorten the switching operation.

Figures 10A, 10B, 10C:
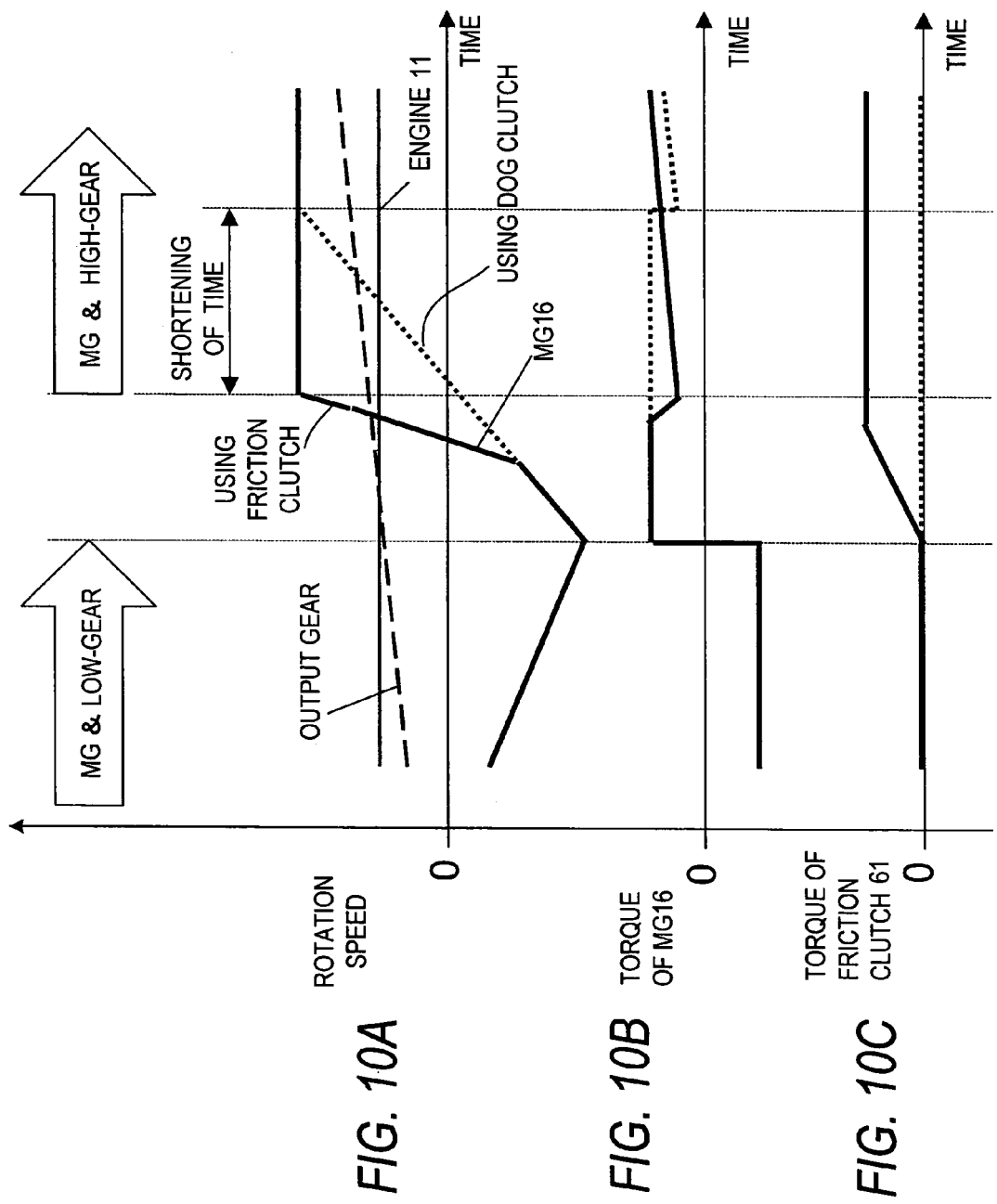
FIG. 10A shows rotation speeds of the MG, the engine and the output gear with respect to time.
FIG. 10B shows torque of the MG with respect to time.
FIG. 10C shows torque of the friction clutch with respect to time.

One example of a gear switching operation for an MG according to the third embodiment is described with reference to FIG. 10A-10C.

Immediately before shifting from "MG @ low gear" to "MG @ high gear", the MG 16 rotates in opposite directions to the engine 11, at high speed. Thereafter, when the dog clutch 33 is disengaged, the MG 16 generates an electricity generating torque in order to absorb the momentum of the MG output shaft 41 and the MG itself, thereby reducing its speed of rotation. In this case, by raising the engagement pressure in the multiple-plate clutch 61, it is possible to reduce the speed of rotation of the MG 16 more rapidly, and hence the switching time can be shortened.

Figure 11:
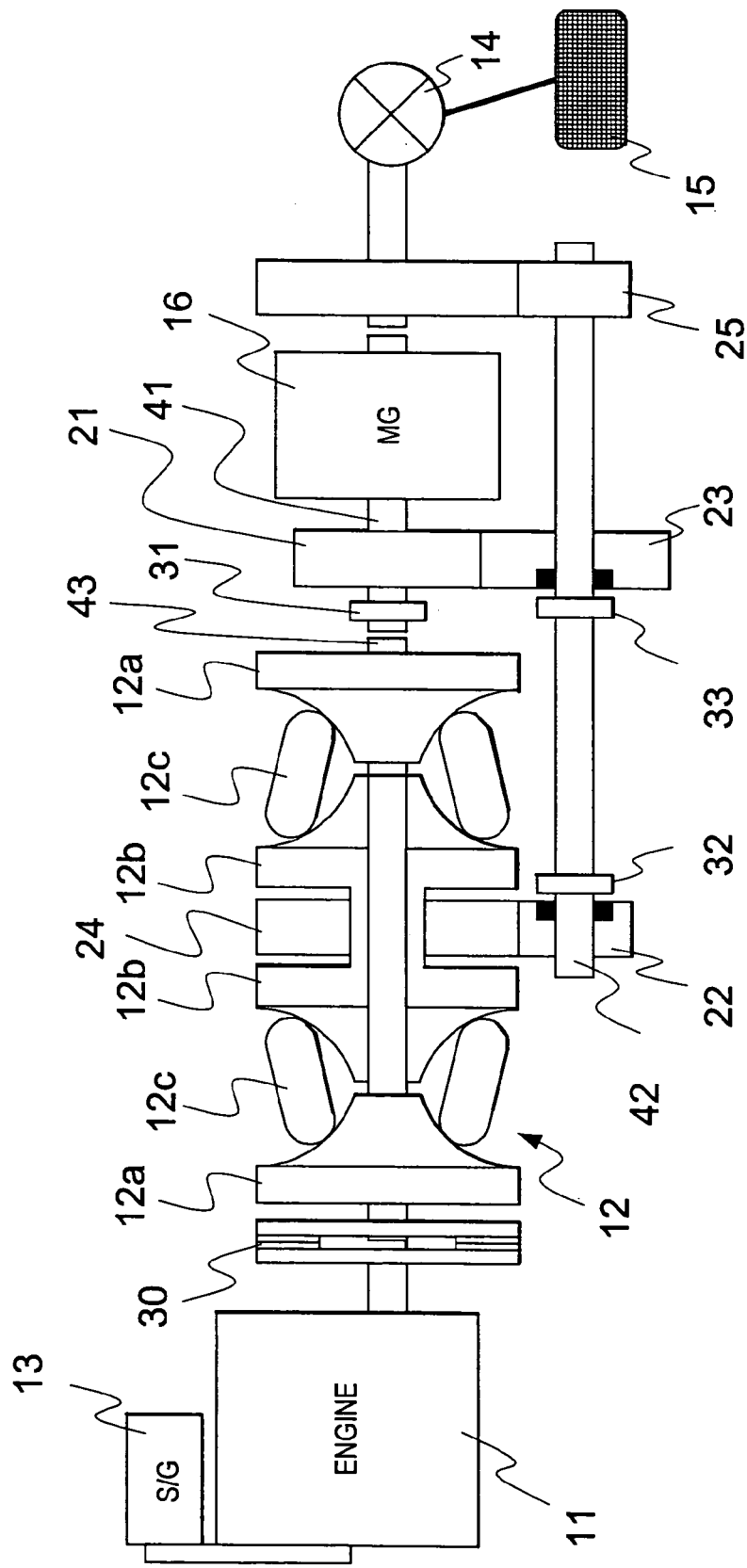
FIG. 11 is a schematic diagram showing a fourth embodiment of a drive system for a hybrid vehicle.

A fourth embodiment of a drive system for a hybrid vehicle will be described now with reference to FIG. 11. FIG. 11 shows an example of a rear-wheel drive vehicle, where the power train is mounted in the longitudinal direction of the vehicle.

The CVT 12, which is a toroidal continuous variable transmission, has an output shaft 42 (second rotating shaft) that is shared with the MG 16. A power roller 12c is disposed between an input disc 12a connected to the engine 11 via a low speed clutch 30, and an output disc 12b connected to the output gear (second gear) 22. The gear ratio is changed continuously by varying the angle of the power roller 12c. The input disc 12a and the output disc 12b are disposed coaxially, and when the vehicle is driven by the engine 11, they rotate in mutually opposite directions. The engine 11 is started by the S/G 13. The engine output shaft (third rotating axle) 43 connects to the engine 11 via the low speed clutch 30, and it also connects to the input disc 12a of the CVT 12. The MG output shaft (first rotating shaft) 41, which is the output shaft of the MG 16, is disposed in parallel with an output shaft 42 that is shared with CVT 12. A first dog clutch 31 is disposed on the MG output shaft 41 for selecting transmission or non-transmission between the engine output shaft 43 and MG output shaft 41. Also, a first gear wheel 21 is disposed on the MG output shaft 41. A third gear wheel 23 is controlled so as to transmit or not transmit drive force by means of a third dog clutch 33 on the output shaft 42. The second dog clutch 32 connects the engine output shaft 43 with the output shaft 42 via the CVT 12.

The drive force of the engine 11 and the MG 16 transmitted from the output shaft 42 is transferred successively to an output gear 25, a differential gear 14 and a drive wheel 15, thereby causing the vehicle to travel.

According to the present embodiment, it is possible to omit the torque converter, the forward/reverse switching mechanism, and the like, and therefore it is possible to achieve a similar overall length to a conventional system, even if an MG is added.

FIG. 12 is a diagram showing the operational states of the respective clutches in the fourth embodiment. In this embodiment, it is possible to change the operating mode of the drive system readily, by changing the states of the clutches, similarly to the first embodiment (FIG. 7).

The entire contents of Japanese Patent Application P2003-382607 (filed Nov. 12, 2003) are incorporated herein by reference.

Although the invention has been described above by reference to certain embodiments of the invention, the invention is not limited to the embodiments described above. Modifications and variations of the embodiments described above will occur to those skilled in the art, in light of the above teachings. The scope of the invention is defined with reference to the following claims.

What is claimed is:

1. A drive system for a hybrid vehicle, having:
   an engine;
   a motor-generator; and
   a toroidal continuous variable transmission for converting a drive force inputted from at least one of the engine and the motor-generator and transmitting the converted drive force to a drive wheel, comprising an input disc and an output disc disposed coaxially;
   the motor-generator comprising:
   first engaging means for selecting transmission or non-transmission of drive force between the motor-generator and the input disc; and third engaging means for selecting transmission or non-transmission of the drive force between the motor-generator and the drive wheel; and
   the transmission comprises second engaging means for selecting transmission or non-transmission of drive force between the output disc and the drive wheel.

2. The drive system for a hybrid vehicle as defined in claim 1, wherein
   when the second engaging means is disengaged, and the first engaging means and the third engaging means are engaged, the vehicle is driven in reverse by means of the drive force of the engine.

3. A drive system for a hybrid vehicle, comprising:
   an engine;
   a motor-generator;
   a transmission for converting drive force inputted from at least one of the engine and the motor-generator and transmitting the converted drive force to a drive wheel;
   a first rotating shaft, a second rotating shaft and a third rotating shaft disposed mutually in parallel;
   a first gear wheel disposed coaxially with the first rotating shaft;
   a first clutch for engaging the first gear wheel with the first rotating shaft and disengaging the first gear wheel from the first rotating shaft;
   a second gear wheel disposed coaxially with the second rotating shaft;
   a second clutch for engaging the second gear wheel with the second rotating shaft and disengaging the second gearwheel from the second rotating shaft;
   a third gear wheel, engaging with the first gear wheel or the second gear wheel and disposed coaxially with the second rotating shaft or the first rotating shaft; and a third clutch for engaging the third gearwheel with the first rotating shaft or the second rotating shaft and disengaging the third gear wheel from the first rotating shaft or the second rotating shaft;

wherein the motor-generator is connected to the first rotating shaft;

the engine is connected to the third rotating shaft; and the transmission comprises:
  an input disc connected to the third rotating shaft;
  an output disc disposed coaxially with the input disc; and
  a power roller sandwiched in a tiltable fashion between the input disc and the output disc; the speed ratio being changed by varying the angle of tilt of the power roller.

4. The drive system for a hybrid vehicle as defined in claim 3, further comprising a fourth gear wheel disposed coaxially with the third rotating shaft and the input disc, wherein
  the second rotating shaft is a hollow shaft which is disposed coaxially with the third rotating shaft;
  the output disk is connected to the second rotating shaft;
  the first gear wheel meshes with the fourth gear wheel;
  the third gear wheel is disposed coaxially with the first rotating shaft and meshes with the second gear wheel; and
  the third clutch engages the third gear wheel with the first rotating shaft, and disengages the third gear wheel from same.

5. The drive system for a hybrid vehicle as defined in claim 3, wherein, when the second clutch is disengaged and the first and third clutches are engaged, the vehicle is driven in reverse by means of the drive force of the engine.

6. The drive system for a hybrid vehicle as defined in claim 3, wherein the number of teeth on the third gear wheel is lower than the number of teeth on the first gear wheel.

7. The drive system for a hybrid vehicle as defined in claim 3, wherein, when the third clutch is engaged and the first and second clutches are disengaged, the vehicle is started off forward by means of the drive force of the motor-generator.

8. The drive system for a hybrid vehicle as defined in claim 3, wherein the first to third clutches are dog clutches.

9. The drive system for a hybrid vehicle as defined in claim 3, wherein the first clutch is a friction clutch.

10. The drive system for a hybrid vehicle as defined in claim 3, wherein the second clutch is a friction clutch.

11. The drive system for a hybrid vehicle as defined in claim 3, wherein, when the first clutch is disengaged and the second and third clutches are engaged, the vehicle can be driven forward by means of the drive force of the engine and the motor-generator, the transmission transmitting the drive force of the engine and the third gear wheel transmitting the drive force of the motor-generator.

12. The drive system for a hybrid vehicle as defined in claim 3, wherein, when the third clutch is disengaged and the first and second clutches are engaged, the vehicle can be driven forward by means of the drive force of the engine and the motor-generator, the transmission transmitting the drive force of the engine and the first gear wheel transmitting the drive force of the motor-generator.

13. A drive system for a hybrid vehicle, comprising:
an engine;
a motor-generator;
a transmission for converting drive force inputted from at least one of the engine and the motor-generator and transmitting the converted drive force to a drive wheel;
a first rotating shaft, a second rotating shaft and a third rotating shaft disposed mutually in parallel;
a first gear wheel disposed coaxially with the first rotating shaft;
a first clutch for engaging the first rotating shaft with the third rotating shaft, and disengaging the first rotating shaft from the third rotating shaft;
a second gear wheel disposed coaxially with the second rotating shaft;
a second clutch for engaging the second gear wheel with the second rotating shaft and disengaging the second gear wheel from the second rotating shaft;
a third gear wheel disposed coaxially with the second rotating shaft and meshing with the first gear wheel; and
a third clutch for engaging the third gear wheel with the second rotating shaft and disengaging the third gear wheel from the second rotating shaft;
wherein the motor-generator is connected to the first rotating shaft;
the engine is connected to the third rotating shaft; and
the transmission comprises:
  an input disc connected to the third rotating shaft;
  an output disc disposed coaxially with the input disc; and
  a power roller sandwiched in a tiltable fashion between the input disc and the output disc; the speed ratio being changed by varying the angle of tilt of the power roller.

* * * * *